United States Patent [19]
Holmes

[11] 3,897,163
[45] July 29, 1975

[54] WIRE STRAND CONNECTING CLEAT

[76] Inventor: Stannard D. Holmes, Box 331, Narajito, P.R. 00719

[22] Filed: June 11, 1974

[21] Appl. No.: 478,257

[52] U.S. Cl.................. 403/406; 248/263; 24/81 F; 24/130
[51] Int. Cl.² ........................................ F16G 11/00
[58] Field of Search .......... 403/405, 406, 394, 409, 403/400, 211; 114/218; 24/71.3, 81 F, 129 B, 130; 248/263; 256/47, 48, 52, 56

[56] References Cited
UNITED STATES PATENTS

| | | | |
|---|---|---|---|
| 2,144,242 | 1/1939 | Gill | 248/263 |
| 2,510,862 | 6/1950 | Buehl | 24/130 |
| 2,835,015 | 5/1958 | Emmins | 24/71.3 |
| 3,090,343 | 5/1963 | Ronsheim | 24/130 X |

Primary Examiner—Richard J. Scanlan, Jr.
Assistant Examiner—Wayne L. Shedd
Attorney, Agent, or Firm—Scrivener Parker Scrivener and Clarke

[57] ABSTRACT

The invention provides a device for connecting together the ends of two lengths of wire, such as barbed wire, or for connecting spaced parts of a single length of such wire which define a loop in the wire to thereby shorten the wire. The device is unitary and has a back part with edge flanges with long inwardly extending narrow tapered openings formed in both ends of each flange. Each wire is passed through diagonally located openings and is wedged in such openings, and the wire parts which cross at the center of the back part apply pressure on each other, assisting in maintaining them in position. In a modified embodiment the edge flanges are of different widths and the tapered openings at one end of the device are replaced by U-shaped slots.

3 Claims, 5 Drawing Figures

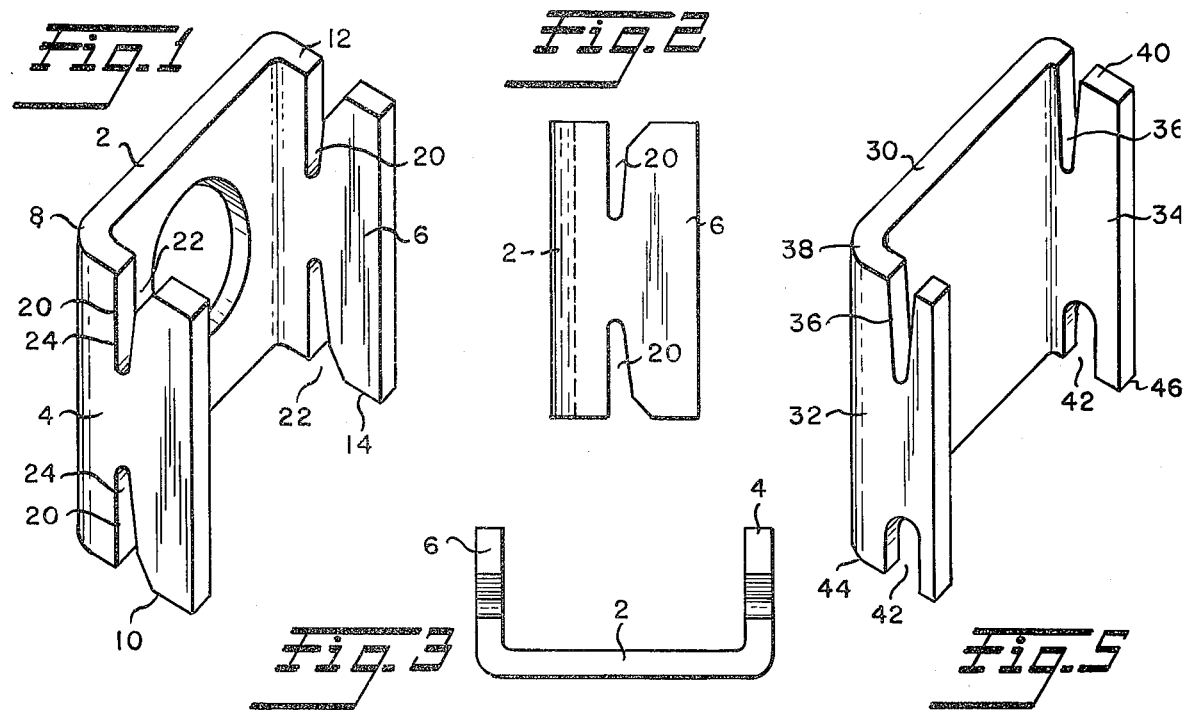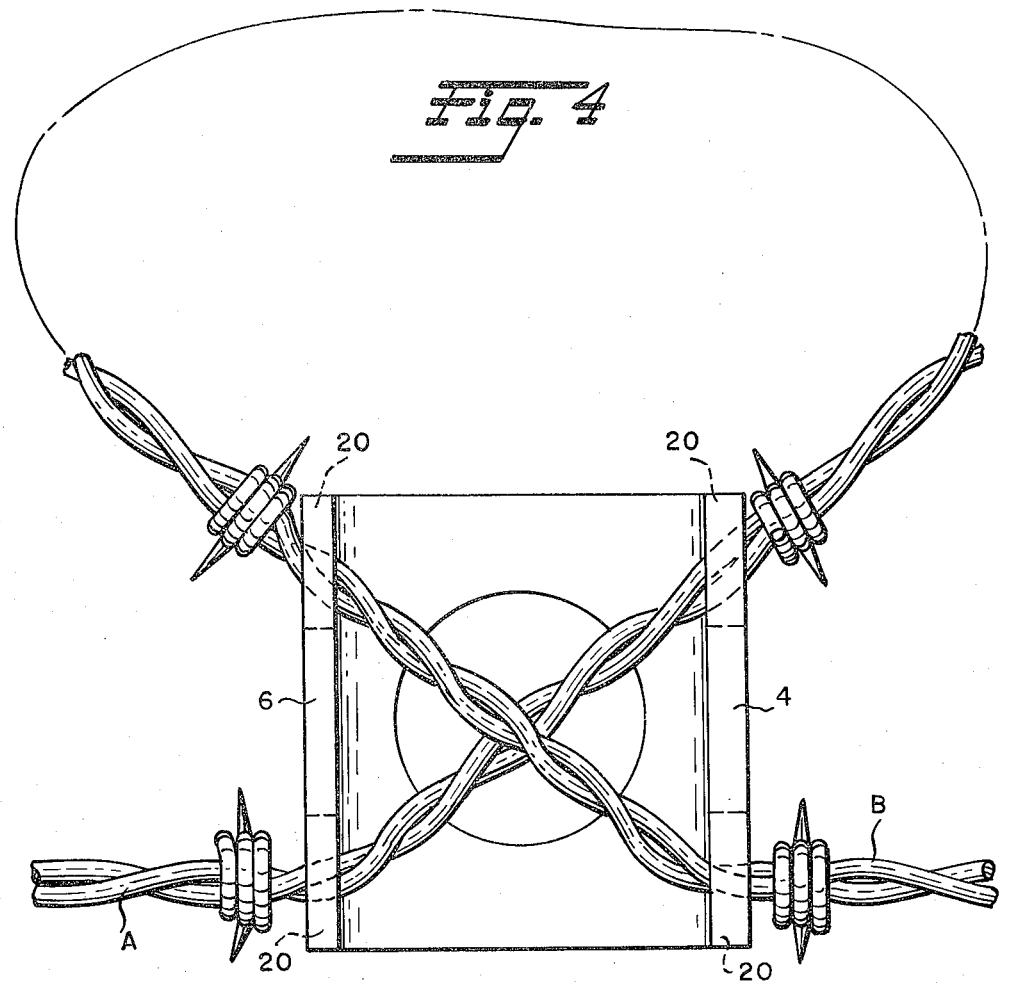

WIRE STRAND CONNECTING CLEAT

BACKGROUND OF THE INVENTION

If is often desirable or necessary to connect the adjacent ends of two strands of wire, such as barbed wire, in order to form a continuous strand, or to connect spaced parts of a single strand of wire in order to shorten the strand by forming a loop therein. Various devices have been provided for accomplishing these purposes, and the device provided by the invention does so in an efficient manner, and may be easily and cheaply made, quickly installed, and has been found to provide a firm and lasting connection.

SUMMARY OF THE INVENTION

The wire connecting device is U-shaped in cross section, and comprises a back part with side edge flanges, each having two aligned end edges. A tapered wire-receiving opening or slot is formed in each of the end edges of the flanges, the openings in each flange being aligned with those in the other. The wires to be connected are introduced through the openings at one end of the device and then passed diagonally across the back and passed through the openings in the other end of the opposite flange. Tension applied to the wires outside and in directions away from the connecting device forces the wires into the narrow parts of the tapered openings, thereby clamping the wire strands and connecting them, while the parts of the wire which cross each other at the center of the back part press on each other, thus assisting in keeping the wires in place.

DESCRIPTION OF THE DRAWINGS

FIG. 1 is a perspective view of the device provided by the invention;

FIGS. 2 and 3 are, respectively, side and end views;

FIG. 4 is a front view of the device showing its use in attaching two strands of barbed wire or spaced parts of a single strand, and FIG. 5 is a perspective view of a modified form of the invention.

DESCRIPTION OF THE INVENTION

The device provided by the invention has the function of connecting the adjacent ends of two strands of wire, or the function of connecting two spaced parts of a single strand so that the parts of the wire between these spaced parts will form a loop, thereby shortening the effective length of the wire strand.

The connecting device is unitary in structure and U-shaped in cross section, and comprises a flat back part 2 and side edge flanges 4, 6 of equal width. The back part 2 and the flanges 4, 6 are all of the same length whereby the end surfaces of these three parts are aligned, the side edge flange 4 having end surfaces 8, 10 and the flange 6 having end surfaces 12, 14.

Extending inwardly from each end surface of each flange toward the other end surface of the same flange is an inwardly extending tapered opening 20. All of these openings are of the same shape and each has a wide entrance 22 at and adjacent the end edge and a tapered narrow inner part 24 defined by walls which converge in the direction away from the end edge. The tapered openings are preferably of the same size and same length and each extends from an end edge surface less than half the distance toward the end surface at the other end of the flange in which it is formed. At their inner, smaller ends each tapered opening 20 is of a width just sufficient to tightly engage a strand of barbed wire.

The use of the device provided by the invention is illustrated in FIG. 4 and it will be seen that the end parts of two wire strands A and B will be introduced through the two openings 20 at one end of the device, and each strand is then passed diagonally across the back part 2 of the device and then passed through the tapered opening in the other end of the flange opposite that through which it was introduced. With the strands in these positions tension applied to the two strands in the directions of the arrows in FIG. 4, which are the directions away from the connecting device, will cause each strand to be forced downwardly into the two tapered openings through which it is passed, thereby wedging it into the narrow bottoms of these openings. Thus, each wire is gripped by two slots, and the pull on the wire forces it downward in the upper slot and upward in the lower slot. The cross-over of the wires at the center of the back part, with the resultant friction between them, keeps the connector in place on the wires if tension is released. The directness and intenseness of the grip of the tapered slots on the wires is relieved by the vectoral advantage made possible by the bend of 45° between the parts of the wire outside and inside the connector.

In addition to the connection of the ends of two strands of wire, the connecting device may be used to shorten the effective length of a single strand of wire by forming a holding loop in it, this use of the device being shown in FIG. 4 in dot-dash lines. Thus, the wire parts A and B may be parts of a single strand of wire which is to be shortened, and this is done by forming loop C in the strand and connecting the spaced parts A, B of the wire by the connecting device in the same manner as is described above.

A second embodiment of the invention is disclosed in FIG. 5 and comprises the back part 30 having side edge flanges 32, 34 one of which, 32, is wider than the other 34. Tapered slots 36 extend inwardly from aligned end edges 38, 40 of the two flanges and U-shaped openings 42 extend inwardly from the other aligned end edges 44, 46. The tapered slot and the U-shaped opening in the wider flange 32 are displaced from the corresponding openings in the narrower flange 34 in the direction away from the back part 30. In general, this embodiment is used, and is operable, in the same way as that disclosed in FIG. 1.

An opening 50 may be formed in the back part 2 to reduce the weight of the connecting device without affecting its connecting function.

I claim:

1. A device for connecting the ends of two wire strands or the spaced parts of a single wire strand, comprising a unitary device having a rectangular flat back part having end and side edges, two rectangular flanges extending in the same direction from the side edges of the back part and at right angles thereto and each having end edges aligned respectively with each other and with the end edges of the back part, each of said flanges having an inwardly tapered opening therein extending inwardly from each of its end edges to receive a strand of wire.

2. The connecting device according to claim 1, in which each opening has a wide entrance at the end edge and a narrow inwardly tapered inner part defined by converging walls.

3. The connecting device according to claim 1, in which the openings in two of the aligned end edges of the flanges are of U-shape.

* * * * *